Sept. 18, 1962 C. E. REESBY ET AL 3,054,848
LOGGING TOOL COUPLING APPARATUS
Filed April 8, 1958 2 Sheets-Sheet 1
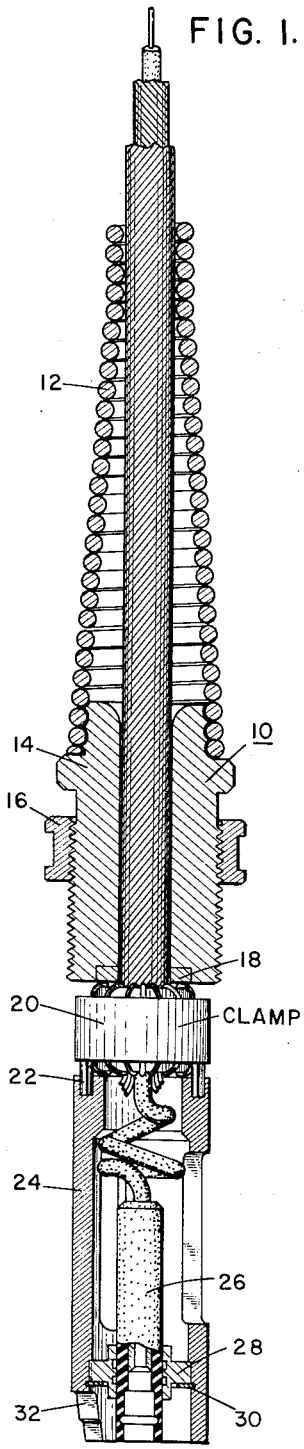
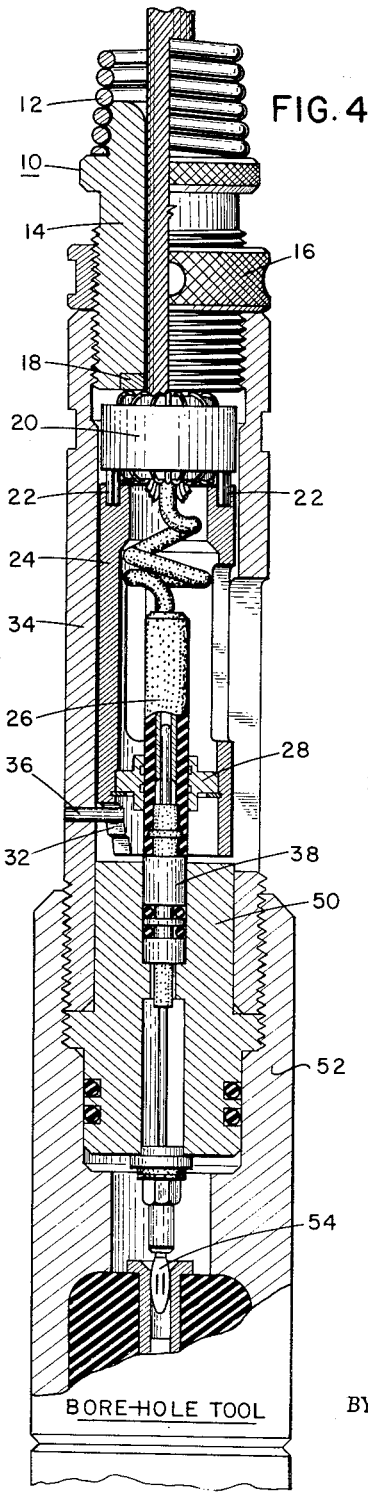
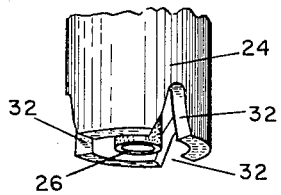
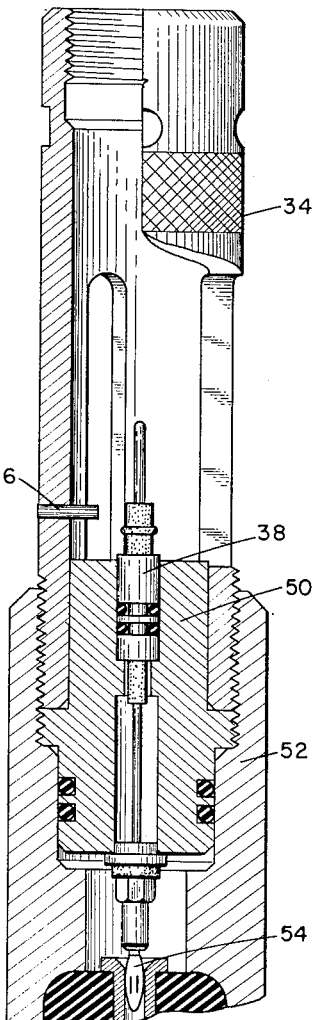
INVENTORS.
CARL E. REESBY,
ORVILLE R. SMITH,
BY Lyon and Lyon
ATTORNEYS.

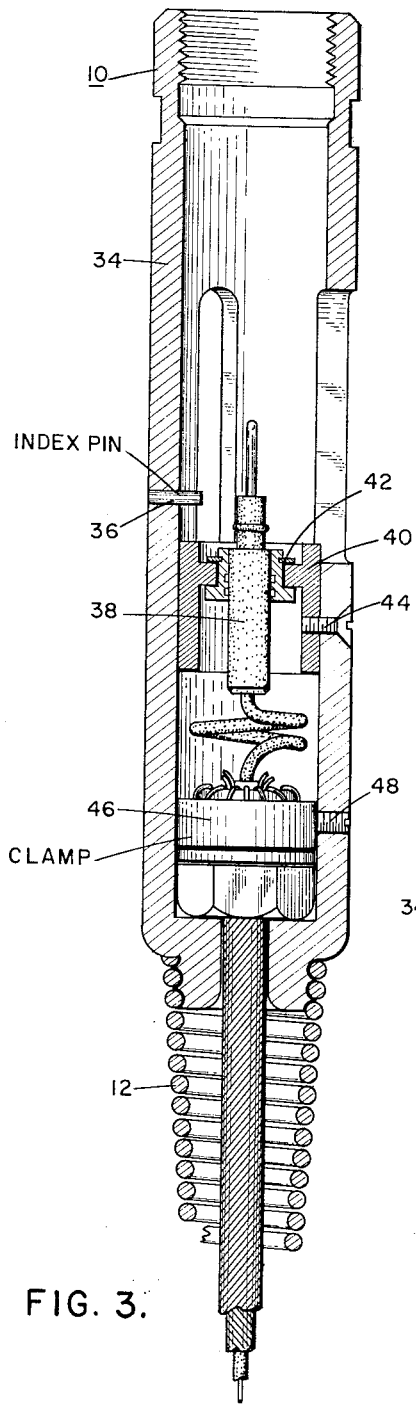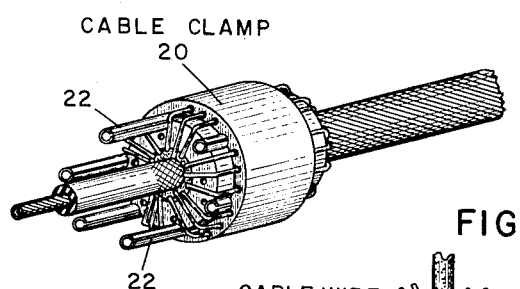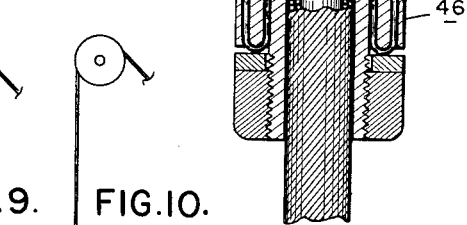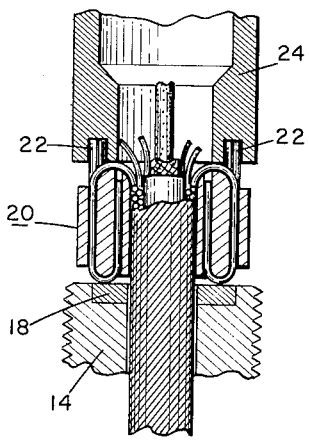

United States Patent Office 3,054,848
Patented Sept. 18, 1962

3,054,848
LOGGING TOOL COUPLING APPARATUS
Carl E. Reesby and Orville R. Smith, Houston, Tex., assignors to Halliburton Company, a corporation of Delaware
Filed Apr. 8, 1958, Ser. No. 727,127
4 Claims. (Cl. 174—89)

This invention generally relates to electrical well logging and service apparatus and more particularly relates to an improved coupling apparatus for attaching any of several well logging tools to a common logging cable.

It is present practice to log well formations with logging tools each capable of sensing a particular characteristic therein such as electrical resistivity, radioactivity, acoustic properties, electromagnetic properties, etc., or combinations of these. Additionally, various well services are individually performed within a well bore such as perforating, side-wall coring, setting of bridge plugs, etc. The normal procedure in using these logging or service tools is to provide a common well logging truck and electrical conductor well loggng cable to which the various tools required with each logging or service operation is individually attached as required. In present field practice each tool is individually spliced to such cable, requiring considerable skill and unproductive time.

The tools thus used are diverse in size and weight, ranging from about one and three eighths to six inches in diameter and from a few to several hundred pounds in weight. Further, the perforating tools and other service type tools using explosives impose great shock loadings on the cable and cable connections.

It has been desirable to provide some means with which the cable could be universally connected to each and every tool in a quick and simple manner, which would be of diameter as small as the smallest tool and yet have sufficient strength to withstand the heavy weight and shock loading of the larger service tools. In the past this has been accomplished by providing individual couplings of different sizes and strength for each respective tool which, as previously mentioned, are individually spliced to the cable as required.

It is accordingly an object of this invention to provide coupling apparatus which may be readily and repeatedly coupled to any of the various tools normally used with a well logging cable and which will not require separate splicing to the cable upon each change with the attendant requirement of valuable time and splicing tools.

Briefly described, this invention provides a first cable clamp adapted to be fastened about a stranded wire electrical conductor logging cable. A cylindrical clamp extension sleeve is axially connected to said clamp by removable connection means in a manner preventing relative rotation. A hollow cylindrical housing is fitted around the connected clamp and sleeve in a manner permitting ready removal. Means such as a dowel pin is provided to retain said connected clamp and sleeve in splined relation within said housing. An annular male retaining nut, adapted to pass over cable, is disposed in releasable connection within one end of the housing for axially retaining the connected clamp sleeve within the housing. A lock ring is provided to releasably lock the nut in connection with the housing. A kink prevention spring, adapted to pass over cable, is connected to the nut exteriorly of said housing. A first electrical connector is concentrically supported within the sleeve in electrically insulated and liquid tight connection with a second electrical connector which is concentrically supported within the housing for electrical coupling of at least one electrical conductor of a logging cable. A second cylindrical cable clamp may be fastened about a logging cable supported within a second end of said housing and a second kink prevention spring may be connected to said second housing end.

Other objects and advantages of the invention will become more apparent by reference to the following detailed description taken in view of the accompanying drawings in which:

FIGURE 1 is a longitudinal cross-section of an upper component of the coupling which is normally retained on the well logging cable.

FIGURE 2 is a longitudinal cross-section of one form of the lower complementary component of the coupling which will be permanently attached to each particular well logging or service tool.

FIGURE 3 is a longitudinal cross-section illustrating an alternate form of the lower coupling component of FIGURE 2 which will be attached to a short lead cable or cable electrode of a particular tool.

FIGURE 4 is a longitudinal cross-section illustrating the coupling components shown in FIGURES 1 and 2 in assembled relation.

FIGURE 5 is an isometric view of a portion of the clamp sleeve of FIGURE 1, illustrating the terminal end portion.

FIGURE 6 is an isometric view of an assembled cable clamp of FIGURE 1.

FIGURE 7 is a longitudinal cross-section of the assembled cable clamp of FIGURE 1.

FIGURE 8 is a longitudinal cross-section of a lower cable clamp of FIGURE 3.

FIGURE 9 is a view of the coupling assembled from the forms illustrated in FIGURES 1 and 2 for use with a well logging or service tool.

FIGURE 10 is a view of the coupling assembled from the forms illustrated in FIGURES 1 and 3 as is used with a logging tool having a cable reference electrode.

Referring to FIGURE 1, there is shown a well logging cable extending downwardly through a kink prevention spring 12 and a support nut 14 into connection with an upper cable clamp 20. Spring 12 is threadedly attached to the upper portion of the nut 14. A lock ring 16 is disposed in threaded connection on nut 14 for longitudinal adjustment along the nut. Disposed between the nut 14 and clamp 20 is a gripping washer 18 composed of a material softer than the strands of a cable, for example brass. Connected to cable clamp 20 by means of dowel pins 22 is an upper clamp extension sleeve 24. As illustrated, dowel pins 22 are of expandable type, commonly termed "roll" pins. Pins 22 connect clamp 20 and sleeve 24 in releasably connected fashion while preventing relative rotation therebetween. An upper electrical connector 26, adapted for connection to the conductor of a logging cable, is concentrically supported within the sleeve 24 by means of a positioning plate 28. Plate 28 is retained within sleeve 24 by means of a retainer snap ring 30. A plurality of index notches 32, also seen in FIGURE 5, are provided in the lower end of sleeve 24.

Assembly of the upper clamp 20 is more clearly illustrated in FIGURES 6 and 7. The cable is shown to be extended through the clamp and the individual strands of the cable lays are looped back through an outer ring of holes which are disposed in the cable clamp parallel to its axis. The strands are then in turn looped inwardly back and downwardly through an inner ring of holes similarly disposed. As is seen, upon referring to FIGURES 4 and 7, tension applied to the cable will draw the strands of the cable looped over the upper end of the clamp into forceable contact with the resilient washer 18, thereby gripping each strand of the cable proportionate to the total tension applied. Thus, an even stress is applied to each strand of the cable and firm support is provided which will prevail even to the parting of the strands.

One form of the lower component of coupling 10 is shown in FIGURE 2. As shown, a housing 34 is internally threaded at its upper end to accommodate the threaded connection of the nut 14. Concentrically supported within housing 34 is a lower electrical connector 38 supported in a support mount 50. Provided in the wall of housing 34 is a means of engaging the index notches of the clamp sleeve 24, exampled as a dowel pin 36. As shown, the housing 34 is threadedly or otherwise connected directly into a well logging tool 52. Shown as an example, connector 38 extends through lower connector support body 50 in insulated and sealed relation and terminates in a "banana" type connection 54 into the tool proper.

Another embodiment of the lower component of coupling 10 is illustrated in FIGURE 3. As shown, the housing 34 with the dowel pin 36 and lower male connector 38 are identical in relation to the form shown in FIGURE 2. In this form connector 38 is supported in a support plate 40 and retained in plate 40 by means of a retainer snap ring 42. Plate 40 is supported within housing 34 by means of a screw or other retaining means 44. Positioned within the lower end of housing 34 is a lower cable clamp 46 fixed in position by a retaining means such as a screw 48. Housing 34 has a passage through its lower end to permit entry of a well logging cable for connection into clamp 46. Connected to the lower end of housing 34 and permitting entry of a well logging cable is a lower kink prevention spring 12.

Assembly of the lower cable clamp 46 is shown in FIGURE 8. Clamp 46 is similar in function to the upper clamp 20, but relies on a soft washer initially supported by a threaded nut to provide initial gripping contact with the strands. Additional bearing against this resilient washer provides an even stress distribution on the strands as previously described.

Assembly of the upper and lower component members of FIGURES 1 and 2 are illustrated in FIGURE 4. As shown, the pin 36 registers within one of the notches 32, preventing relative rotation of clamp 20 within the housing 34. Connection is made between the connectors 26 and 38. Nut 14 is threaded into housing 34 such distance necessary to provide longitudinal support for the connected cable clamp 20 and sleeve 24. Lock ring 16 is rotated along the nut 14 into firm contact with the housing 34 to prevent inadvertent disconnection of the nut 14. It is seen that the dowel pins 36 and 22 prevent any relative rotation of the upper cable clamp 20 relative to housing 34, thus preventing any tendency of cable twist to disconnect the nut 14. It is further seen that the double looped strands of cable shown in the upper portion of clamp 20 bear against support washer 18 and are cushioned against distortion by the washer when tension is applied to the well logging cable.

The form of housing 34 as illustrated in FIGURE 3 finds primary application in electric logging tools of the type having an extended insulated cable above the tool which terminates with a reference electrode. As shown, a cable lead extends into connection with lower cable clamp 46. Application of this form of the coupling 10 is clearly illustrated in FIGURE 10. Use of this form of the coupling 10 with a logging tool presents the added advantage of being able to pass the coupling over a cable sheave at the surface of the ground without detriment to the cable or the coupling.

An application of the more common embodiment of the housing 34 illustrated in FIGURE 2 is shown in FIGURE 9. As shown, the housing 34 is connected directly to the upper end of the well logging tool. The upper component of coupling 10 may be readily and rapidly changed from the tool illustrated in FIGURE 9 to that of FIGURE 10 in the manner previously described.

As seen in FIGURES 1 through 4, the side walls of clamp sleeve 24 and housing 34 are provided with slots adapted for alignment upon registry of sleeve notch 32 with housing pin 36. The purpose of these ports is to provide visual inspection of the connectors 26 and 38 upon assembly, and also to provide ready equalizing of fluid pressure interiorly and exteriorly of the coupling.

In operation spring 12 and lock ring 16 are assembled with nut 14 and slipped over the cable. The cable is then connected to the cable clamp 20 as illustrated in FIGURES 6 and 7. Clamp sleeve 24 is connected to the cable clamp 20 with the pins 22. The cable conductor is connected to the upper connector 26 and the connector plate 28 then inserted into sleeve 24 and latched with snap ring 30. The connected clamp 20 and sleeve 24 are then inserted into the housing 34 in such manner as to provide registry of the pin 36 into an index notch 32. The nut 14 is threaded into the upper portion of housing 34 into firm contact with the clamp 20. Finally, the lock ring 16 is locked into firm contact with the housing 34.

It is noticed that, once assembled, the clamp sleeve 24, clamp 20, nut 14, and spring 12 may remain on the logging cable at all times and may be readily switched to any tool provided with the lower component forms of the coupling of FIGURES 2 or 3.

When provided as herein illustrated, it has been found that this coupling presents major advantages in connection of tools of varied uses, sizes and weights. It has also been found to withstand the extremely rough usage and high shock loading imposed by explosive service tools.

It is to be understood that the illustrative embodiments disclosed herein are susceptible of numerous modifications in form and detail, all falling in the scope of this invention. The invention therefore is to be regarded as being limited only by the scope of the following claims.

That being claimed is:

1. In well tool coupling apparatus the combination of; a cable clamp of the type including an annular body with at least two concentric rings of holes axially disposed within the annulus of said body for attachment to stranded wire logging cable by reverse looping of individual cable strands through respective holes of said rings; a hollow cylindrical clamp entension sleeve; dowel pin means axially connecting said sleeve to said clamp against relative rotation; a hollow cylindrical housing adapted for connection to a well tool removably fitted around said connected clamp and sleeve; dowel pin means disposed within the wall of said housing and in a notch in said sleeve supporting said sleeve within said housing in splined relation; a male nut annular retaining means adapted to pass over cable connected into one end of said housing for axially retaining said connected clamp and sleeve within said housing; an adjustable locking ring axially adjustable along said nut releasably locking said nut into connection with said housing; and a first electrical connection means concentrically supported within said sleeve in electrically insulated and liquid tight connection with a second electrical connector means concentrically supported within said housing for electrical connection of at least one electrical conductor of a logging cable.

2. In well tool coupling apparatus the combination of; a cable clamp of the type including an annular body with at least two concentric rings of holes axially disposed within the annulus of said body for attachment to stranded wire logging cable by reverse looping of individual cable strands through respective holes of said rings; a hollow cylindrical clamp extension sleeve; means axially connecting said sleeve to said clamp against relative rotation; a hollow cylindrical housing adapted for connection to a well tool removably fitted around said connected clamp and sleeve; spline means disposed within said housing and in said sleeve supporting said sleeve within said housing in splined relation; annular retaining means adapted to pass over cable connected into one end of said housing for axially retaining said connected clamp and sleeve within said housing; and an adjustable locking means releasably locking said retaining means into connection with said housing.

3. In well tool coupling apparatus the combination of; a first cable clamp of the type including an annular body with at least two concentric rings of holes axially disposed within the annulus of said body for attachment to stranded wire logging cable by reverse looping of individual cable strands through respective holes of said rings; a hollow cylindrical clamp extension sleeve; dowel pin means connecting said sleeve to said first clamp against relative rotation; a hollow cylindrical housing removably fitted around said connected clamp and sleeve; dowel pin means disposed within the wall of said housing and in a notch in said sleeve supporting said sleeve within said housing in splined relation; a male nut annular retaining means adapted to pass over cable connected into one end of said housing to axially retain said connected clamp and sleeve within said housing; an adjustable locking ring axially adjustable along said nut releasably locking said nut into connection with said housing; a first electrical connection means concentrically supported within said sleeve in electrically insulated and liquid tight connection with a second electrical connector means concentrically supported within said housing for electrical connection of at least one electrical conductor of a logging cable; and a second cable clamp similar to said first clamp supported within a second end of said housing.

4. In well tool coupling apparatus the combination of; a first cable clamp of the type including an annular body with at least two concentric rings of holes axially disposed within the annulus of said body for attachment to stranded wire logging cable by reverse looping of individual cable strands through respective holes of said rings; a hollow cylindrical housing removably fitted around said connected clamp; spline means disposed within the wall of said housing and in said clamp supporting said clamp within said housing in splined relation; an annular retaining means adapted to pass over cable connected into one end of said housing to axially retain said connected clamp within said housing; an adjustable locking means releasably locking said retaining means into connection with said housing; electrical connection means supported within said housing for insulated electrical connection of at least one electrical conductor of a logging cable; and a second cable clamp similar to said first clamp supported within a second end of said housing.

References Cited in the file of this patent

UNITED STATES PATENTS

| | | |
|---|---|---|
| 1,012,617 | Egly | Dec. 26, 1911 |
| 2,562,880 | Andrew | Aug. 7, 1951 |

FOREIGN PATENTS

| | | |
|---|---|---|
| 647,335 | Great Britain | Dec. 13, 1950 |
| 877,467 | Germany | May 26, 1953 |